United States Patent [19]
Kramer

[11] Patent Number: 6,050,130
[45] Date of Patent: Apr. 18, 2000

[54] OIL CONTAMINATION DETECTION ASSEMBLY

[75] Inventor: Dennis A. Kramer, Troy, Mich.

[73] Assignee: Meritor Heavy Vehicle Systems, LLC, Troy, Mich.

[21] Appl. No.: 09/167,285

[22] Filed: Oct. 7, 1998

[51] Int. Cl.[7] ................................................. G01N 21/17
[52] U.S. Cl. ..................... 73/24.01; 73/31.03; 73/129; 340/453
[58] Field of Search ................................. 73/24.02, 24.01, 73/31.03, 31.07, 121, 129; 340/438, 453

[56] References Cited

U.S. PATENT DOCUMENTS 4,932,247  6/1990  Gorres ........................................ 73/129
5,852,398  12/1998  Helman ..................................... 340/438

*Primary Examiner*—Michael Brock
*Attorney, Agent, or Firm*—Howard & Howard

[57] ABSTRACT

An oil contamination detection assembly includes a housing adapted for installation into a vehicular pneumatic brake system having a supply of air contaminated with oil. A surface is disposed within the housing for communicating with the air of the brake system and accumulating a film of the oil contaminating the air. A sensor directs a wave, such as an electromagnetic wave, having a predetermined characteristic at the surface, receives a wave reflected from the surface having a characteristic altered by the film of oil accumulated on the surface, and produces an oil contamination warning signal based upon the altered characteristic of the reflected wave.

9 Claims, 1 Drawing Sheet

OIL CONTAMINATION DETECTION ASSEMBLY

BACKGROUND OF THE INVENTION

This application relates to a unique assembly for detecting oil contamination in a vehicular pneumatic brake system.

Heavy vehicles, such as trucks and tractor-trailers, typically use a pneumatic brake system. Pneumatic brake systems, sometimes referred to as compressed air brake systems, use air pressure to actuate the brakes of the heavy vehicle. Typically, pneumatic brake systems include an air compressor and an air dryer. The air compressor includes a cylinder, a piston which reciprocates within the cylinder, and a piston seal disposed between the outer circumference of the piston and the inner circumference of the cylinder. The reciprocating movement of the piston is used to compress or pressurize the brake system air supply. The air dryer includes a canister filled with desiccant to remove moisture and other contaminants from the air supply. Periodically, the canister is purged to remove the moisture absorbed by the desiccant.

Pneumatic brake systems often experience an oil contamination condition, commonly referred to as "blow-by". This type of contamination occurs when lubricating oil located on one side of the air compressor piston is blown by the piston seal into the brake system air supply located on the opposing side of the piston. As the contaminated air is moved through the air dryer, the oil is absorbed by the desiccant. Unlike moisture, oil absorbed by the desiccant cannot be purged out of the air dryer. Over time, the absorption and retention of an increasing amount of oil prevents the desiccant from absorbing additional moisture, thereby allowing some moisture to pass through the air dryer into other portions of the brake system. This non-absorbed moisture can freeze inside the brake system during cold temperature conditions and damage many brake system components.

To avoid brake system damage caused by oil contamination, the air dryer must be periodically serviced by replacing the desiccant canister. Determining when to service the air dryer for excessive oil contamination is a difficult task. Accordingly, it would be desirable to provide an oil contamination detection assembly for detecting when service of the air dryer for oil contamination is necessary.

SUMMARY OF THE INVENTION

In a disclosed embodiment of this invention, an oil contamination detection assembly includes a housing adapted for installation into a vehicular pneumatic brake system having a supply of air contaminated with oil. A surface is disposed within the housing for communicating with the air of the brake system and accumulating a film of the oil contaminating the air. A sensor directs a wave, such as an electromagnetic wave, having a predetermined characteristic at the surface, receives a wave reflected from the surface having a characteristic altered by the film of oil accumulated on the surface, and produces an oil contamination warning signal based upon the altered characteristic of the reflected wave. In this manner, the detection assembly can predict when service of the brake system for oil contamination may be necessary.

In a preferred embodiment of this invention, the detection assembly is installed in an air line within the brake system and the housing of the detection assembly includes a cap portion which supports the reflecting surface and is removable from the housing for servicing the reflecting surface.

These and other features of the present invention will be best understood from the following specification and drawings, the following of which is a brief description.

DETAILED DESCRIPTION OF THE PREFERRED EMBODIMENT

Figure 1:
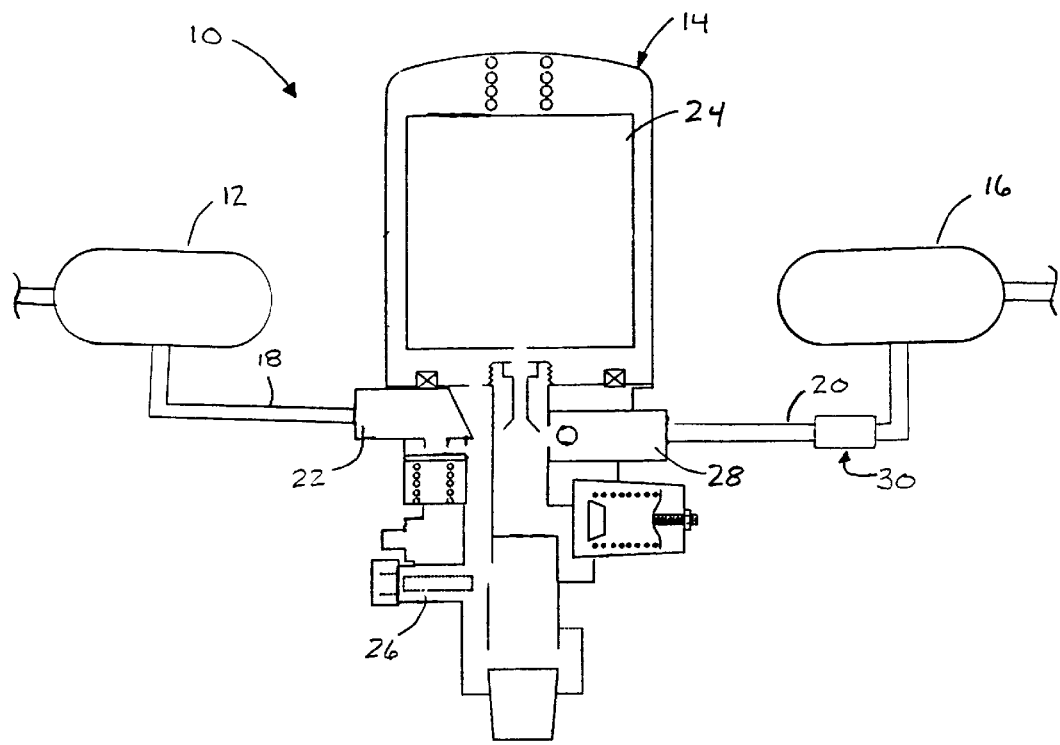
FIG. 1 is a schematic diagram of a portion of a vehicular pneumatic brake system including an oil contamination detection assembly in accordance with the present invention.

FIG. 1 is a schematic diagram of a portion of a vehicular pneumatic brake system 10, sometimes referred to as a compressed air brake system. The brake system 10 includes an air compressor 12 for pressurizing or compressing an air supply, an air dryer assembly 14 for removing moisture and other contaminants from the air supply, and a reservoir 16 for storing the air supply. The air compressor 12 is in pneumatic communication with the air dryer assembly 14 via a first pneumatic line 18. The air dryer assembly 14 is in pneumatic communication with the reservoir 16 via a second pneumatic line 20.

The air compressor 12 typically receives air from an engine intake manifold or an air filter (not shown) and compresses the air, thereby forcing the compressed air through the first pneumatic line 18 to the air dryer assembly 14. The air dryer assembly 14 includes an inlet port 22 which receives the air from the first pneumatic line 18, a replaceable desiccant canister 24 which removes moisture and other contaminants, such as oil, from the air passing through the assembly 14, an air dryer heater 26 which warms the air passing through the assembly 14, thereby preventing the moisture captured in the canister 24 from freezing during cold temperature conditions, and an outlet port 28 which delivers the heated, moisture and contaminant-free, compressed air into the second pneumatic line 20. The second pneumatic line 20 directs the compressed air into the reservoir 16 for storage. The compressed air stored in the reservoir 16 is used to supply air pressure to the brakes of a vehicle (not shown). An oil contamination detection assembly 30 is shown installed in the second pneumatic line 20. Alternatively, the detection assembly 30 could have been installed the first pneumatic line 18.

Figure 2:
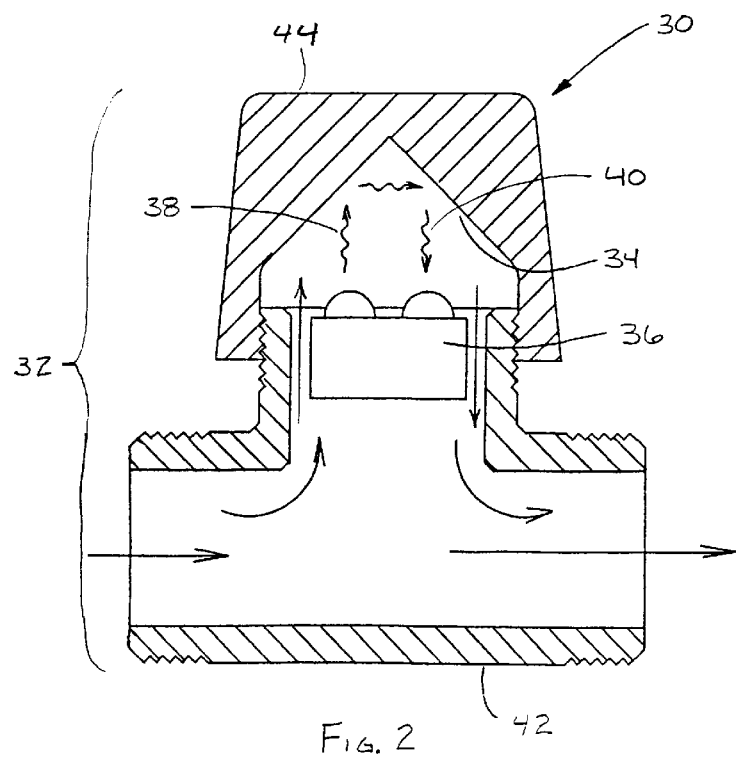
FIG. 2 is a cross-sectional view of the oil contamination detection assembly in accordance with the present invention.

FIG. 2 is a cross-sectional view of the oil contamination detection assembly 30 in accordance with the present invention. The detection assembly 30 includes a housing 32 adapted for installation into the vehicular pneumatic brake system 10. As described above, the detection assembly 30 is preferably installed in either the first or second pneumatic line 18 or 20, thereby establishing a flow of air through the housing 32 as generally illustrated by the solid arrows in FIG. 2.

A surface 34 is disposed within the housing 32 for communicating with the air of the brake system 10 and accumulating a film of the oil contaminating the air. A sensor 36 directs a wave 38, such as an electromagnetic wave, having a predetermined characteristic at the surface 34. A wave 40 is reflected from the surface 34 and has a characteristic altered by the film of oil accumulated on the surface 34. To facilitate this reflection, the surface 34 could be coated with a material having strong reflective qualities. The sensor 36 receives the reflected wave 40 and produces an oil contamination warning signal based upon the altered characteristic of the reflected wave 40.

As more and more oil accumulates over time on the surface 34, the characteristic of the reflected wave 40 is further and further altered. One of ordinary skill in the art will appreciate that the amount by which the characteristic of the reflected wave 40 is altered, relative to the predetermined characteristic of the original wave 38, may be correlated with a specific level of oil contamination within the desiccant canister 24. In this manner, the detection assembly 30 may be adapted or adjusted to produce the oil contamination warning signal when the amount of oil contamination within the desiccant reaches a predetermined level, thus indicating that the canister 24 should be serviced or replaced.

The housing 32 of the detection assembly 30 includes a tee portion 42 for communicating with the air of the brake system 10 and a cap portion 44 carrying or supporting the surface 34. Preferably, the tee portion 42 includes a pair of threaded ends for threaded attachment of the housing 32 into the brake system 10.

After the desiccant canister 24 has been serviced or replaced, the oil contamination detection assembly 30 is reset by replacing the surface 34 or by removing or cleaning the film of oil from the surface 34. As a result, the cap portion 44 is removable from the tee portion 42 for servicing the surface 34. Preferably, the removable cap portion 44 is threaded to the tee portion 42 as illustrated in FIG. 2.

In a preferred embodiment of the present invention, the surface 34 is reflective and the sensor 36 is an infrared light transceiver. The infrared light transceiver directs a beam of light having a predetermined light intensity at the reflective surface. A beam of light is reflected from the reflective surface and has a light intensity reduced by the film of oil accumulated on the reflective surface. The infrared light transceiver receives the reflected beam of light and produces an oil contamination warning signal based upon the reduced light intensity of the reflected beam of light, such as when the reduced light intensity passes a predetermined threshold.

Although the present invention has been disclosed in terms of electromagnetic waves, it should be understood that other types of waves, such as ultrasonic waves, may also be used. The main criteria for acceptable types of waves is that the film of oil accumulated on the surface will vary a characteristic of the reflected wave in a predictable manner.

In accordance with the scope of the present invention, an inventive method for detecting a predetermined level of oil contamination in a vehicular pneumatic brake system having a supply of air contaminated with oil is disclosed. The method includes the steps of: exposing a surface to the air of the brake system, accumulating a layer of the oil on the surface, directing a wave having a predetermined characteristic at the surface, receiving a reflected wave from the surface having a characteristic altered by the layer of oil accumulated on the surface, and producing an oil contamination warning signal based upon the altered characteristic of the reflected wave.

Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. An oil contamination detection assembly for a vehicular pneumatic brake system having a supply of air contaminated with oil comprising:

a housing adapted for installation into the brake system;

a surface disposed within said housing for communicating with the air of the brake system and accumulating a film of the oil contaminating the air; and a sensor for directing a wave having a predetermined characteristic at said surface, receiving a wave reflected from said surface having a characteristic altered by the film of oil accumulated on said surface, and producing an oil contamination warning signal based upon the altered characteristic of said reflected wave.

2. An oil contamination detection assembly as set forth in claim 1 wherein said wave is an electromagnetic wave.

3. An assembly as set forth in claim 1 wherein said housing includes a tee portion for communicating with the air of the brake system and a cap portion carrying said surface.

4. An assembly as set forth in claim 3 wherein said cap portion is removable from said tee portion for servicing said surface.

5. An oil contamination detection assembly for a vehicular pneumatic brake system having a supply of air contaminated with oil comprising;

a housing adapted for installation into the brake system;

a reflective surface disposed within said housing for communicating with the air of the brake system and accumulating a film of the oil contaminating the air; and a sensor for directing a beam of light having a predetermined light intensity at said reflective surface, receiving a beam of light reflected from said reflective surface having a light intensity reduced by the film of oil accumulated on said reflective surface, and producing an oil contamination warning signal based upon the reduced light intensity of said reflected beam of light.

6. An oil contamination detection assembly as set forth in claim 5 wherein said sensor is an infrared light transceiver.

7. An assembly as set forth in claim 5 wherein said housing includes a tee portion for communicating with the air of the brake system and a cap portion carrying said surface.

8. An assembly as set forth in claim 7 wherein said cap portion is removable from said tee portion for servicing said surface.

9. A method for detecting a predetermined level of oil contamination in a vehicular pneumatic brake system having a supply of air contaminated with oil, the method comprising the steps of:

exposing a surface to the air of the brake system, accumulating a layer of the oil on the surface, directing a wave having a predetermined characteristic at the surface, receiving a reflected wave from the surface having a characteristic altered by the layer of oil accumulated on the surface, and producing an oil contamination warning signal based upon the altered characteristic of the reflected wave.

* * * * *